April 5, 1955  F. W. SAMPSON ET AL  2,705,634
SHOCK ABSORBER
Filed Feb. 28, 1952
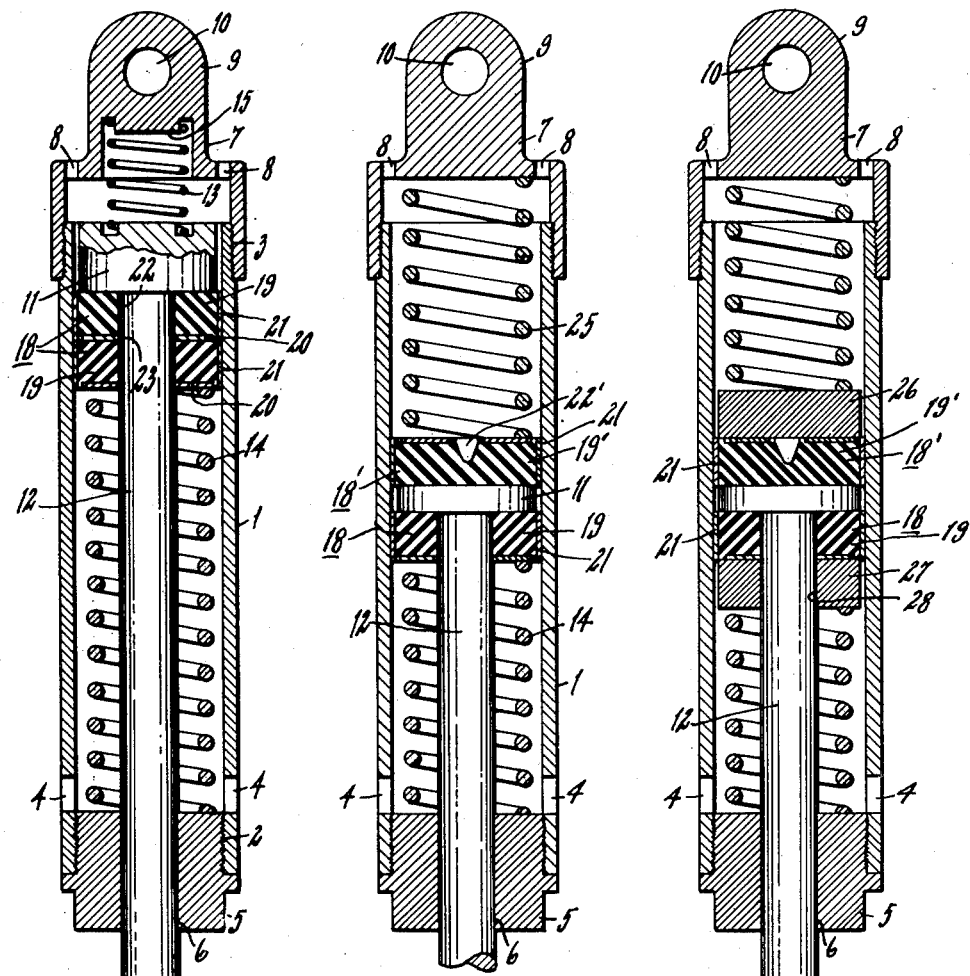
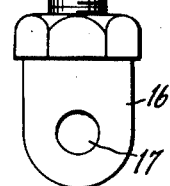
Fig.1
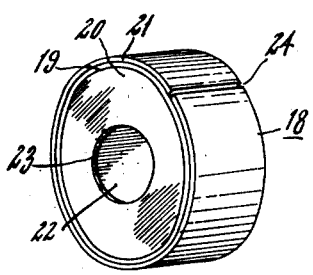
Fig.4
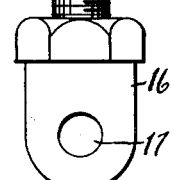
Fig.3
INVENTORS
FREDERICK W. SAMPSON
BY   ALLEN L. EVERITT
THEIR ATTORNEYS

2,705,634

SHOCK ABSORBER

Frederick W. Sampson and Allen L. Everitt, Dayton, Ohio, assignors to General Motors Corporation, Detroit, Mich., a corporation of Delaware Application February 28, 1952, Serial No. 273,832

4 Claims. (Cl. 267—9)

The present invention relates to shock absorbers and particularly to a shock absorber of the frictional resistance type.

One of our objects is to provide an efficient frictional resistance type shock absorber which incorporates means for automatically controlling frictional resistance in proportion to the impact, and wherein the frictional resistance varies in accordance with the rate of acceleration of the shock absorber piston. The aforementioned and other objects are accomplished in the present invention by providing a piston and cylinder construction wherein the frictional resistance opposing relative movement between the piston and cylinder varies directly with the impact or shock transmitted to either the cylinder or piston.

Specifically, the cylinder is provided with a fixture member which is attached or anchored to one of two relatively movable members and the piston is likewise provided with a fixture member which is attached to the other of the two relatively movable members. The function of the shock absorber when installed in a vehicle is to control the movements of the two relatively movable members, for instance, the frame and axle of the vehicle. In the single acting type shock absorber, one end of the piston is provided with one or more cushion assemblies or friction elements. The cushion assemblies comprise a resilient displacement disc of rubber-like material having a thin metal disc bonded to an end surface thereof and a thin metal spring ring or band bonded to the circumferential or peripheral surface thereof. The cushion assembly or assemblies are spring urged against one face of the piston, the spring exerting a predetermined load thereon. Upon relative movement between the fixture members and dependent upon the force of the impact, the resilient annular discs of the cushion assemblies will be compressed along their longitudinal axes with a consequent expansion in their circumferential surfaces. In this manner the frictional resistance to relative movement between the cylinder and piston is controlled in proportion to the impact.

In the double acting type shock absorber, cushion assemblies, of the character described, are spring urged against opposite faces of the piston, thereby controlling the rate of movement between the two relatively movable members in both directions. In a further modification, the cushion assemblies are interposed between the faces of the piston and inertia weight members which serve to regulate the application of frictional resistance in accordance with the impact. In this manner, the amount of shock or impact absorption can be varied in accordance with the specific use of the shock absorber.

Further objects and advantages of the present invention will be apparent from the following description, reference being had to the accompanying drawing, wherein a preferred embodiment of the present invention is clearly shown, and wherein similar reference characters denote similar parts throughout the several views.

In the drawing:

Fig. 1 is a longitudinal, sectional view of a single acting type shock absorber.

Fig. 2 is a longitudinal, sectional view of a double acting type shock absorber.

Fig. 3 is a longitudinal, cross sectional view of the double acting type shock absorber with inertia weights.

Fig. 4 is a perspective view of a cushion assembly utilized in the present invention.

Referring more particularly to Fig. 1 of the drawing, the single acting type shock absorber comprises a cylinder 1 having internal threads 2 at one end and external threads 3 at the other end. Adjacent the internal threads 2 of one end of the cylinder, a plurality of openings 4 are provided allowing the intake and exhaust of air to and from the cylinder during movements of the piston. A cap 5 having an aperture 6 forms one end wall of the cylinder and engages the internal threads 2 of the cylinder. A second cap member 7 engages the external threads 3 of the other end of the cylinder and likewise forms an end wall of the cylinder. Cap member 7 is provided with a plurality of holes 8 allowing the intake and exhaust of air to and from the cylinder during movements of the piston, and is further provided with an integral fixture member 9 having an aperture 10. Within the cylinder 1, a piston 11, having an integral rod 12, is normally maintained at a predetermined position by means of oppositely acting compression springs 13 and 14. Compression spring 13 acts on the head and face of the piston 11 and is attached to an internal boss 15 of the cap member 7. The spring 14 is mounted between the internal surface of the cap member 5 and the rod end face of the piston 11. The piston rod 12 passes through the aperture 6 in the cap member 5 and has attached thereto at its end a fixture member 16 having an aperture 17. The fixture member 9 is adapted to be attached or anchored to one of two relatively movable members and the fixture member 16 is adapted to be attached to the other of the two relatively movable members. When the installation is made on a vehicle the two relatively movable members may take the form of the frame and axle of the vehicle in which instance, the fixture members may be directly attached to the relatively movable members or may be attached indirectly through lever and linkage systems, not shown. The function of the shock absorber is to control the movements between the two relatively movable members, whatever form they may take.

In a single acting type shock absorber, shown in Fig. 1, two cushion assemblies 18 are interposed between the free end of spring 14 and the rod end face of the piston 11. Referring particularly to Fig. 4 of the drawing, each cushion assembly 18 or friction element comprises a resilient displacement disc 19 of rubber-like material, such as natural rubber or a synthetic copolymer, such as neoprene, having a thin metal disc 20 bonded to one end surface thereof and a metal spring ring or band 21 of friction material bonded to the circumferential or peripheral surface thereof. As shown in Fig. 1 of the drawing, both the resilient disc 19 and the thin metal disc 20 are provided with apertures 22 and 23 through which the rod 12 of the piston extends. The cushion assemblies 18 are not bonded to each other, nor are they bonded to the piston 11, but are merely urged against the rod end surface of the piston by means of spring 14. When impact is transmitted to the piston and cylinder structure by means of the fixture members 9 and 16, the deformable resilient discs 19 will be compressed along the longitudinal axes resulting in a radial expansion, before the spring 14 will be compressed, by reason of the spring 14 being preloaded. Radial expansion of the resilient displacement discs 19 due to this compression will cause the ring 21, split at 24, to expand, thereby increasing the frictional resistance to relative movement between the piston 11 and the cylinder 1. The ring 21 need not be split as any form of spring ring will suffice, such as a spiral. The amount of frictional resistance imposed by the split ring or band 21 is proportional to the force of the impact, and the amount of shock absorption and frictional damping can be varied by varying the number of cushion assemblies associated with the piston.

High frequency vibrations are absorbed by the directly loaded cushion assembly or assemblies. That is, the high frequency vibrations are damped by the resilient disc of the cushion assemblies. However, the low frequency vibrations are damped or absorbed by the frictional resistance between the cushion assemblies and the cylinder walls. The cushion assemblies are constructed as wafers to control the stability of shock absorption. Moreover, by reason of the stacking of cushion assemblies as shown in Fig. 1, added frictional damping is effected between the cushions or wafers due to the sliding friction encountered by radial flow when the resilient discs expand circumferentially. In addition, the amount of frictional damping of one cushion assembly can be varied by altering the composition of the resilient annular disc to change the spring rate thereof.

Referring to Fig. 2 of the drawing, a double acting type shock absorber, utilizing the cushion assemblies of the present invention, is shown. The double acting type shock absorber comprises a cylinder 1 having cap members 5 and 7 which define the end walls of the cylinder within which is disposed a piston 11 having a rod 12. Spring 14 urges cushion assembly 18, of the character described, against the rod end face of the piston 11. An oppositely acting spring 25 urges a cushion assembly 18', of modified form, against the head end surface of the piston 11. The oppositely acting springs 14 and 25 normally center the piston 11 within the bore of the cylinder 1. In the modified cushion assembly 18', a resilient annular disc 19' is provided with a substantially cone-shaped slot or groove 22' for purposes of grinding the outside diameter of the ring 21. The cushion assemblies, shown in Fig. 2 of the drawing, perform the same function as those in Fig. 1 of the drawing, except that the movements between the two relatively movable members, attached to the fixtures 9 and the fixture of the piston rod 12, not shown, are controlled in both directions.

The double acting type shock absorber, shown in Fig. 3 of the drawing, is further modified by the provision of inertia weight members 26 and 27 which serve to accentuate the increase in frictional resistance imposed by the cushion assemblies under the force of an impact of predetermined magnitude. Inertia weight member 27 is provided with an aperture 28 through which the piston rod 12 extends and the cushion assembly 18 is interposed between the inertia weight member and the rod end face of the piston 11. The modified cushion assembly 18' is likewise interposed between the inertia weight member 26 and the head end face of the piston 11. By reason of the provision of the inertia weight members 26 and 27, the compression of the annular discs 19 and 19' along their longitudinal axes and the consequent expansion circumferentially is increased by the application of a predetermined impact to either the piston or cylinder. The increase of peripheral expansion likewise effects an increase in frictional resistance imposed by the split metal rings 21 tending to oppose relative movement between the piston and cylinder.

While the embodiment of the present invention as herein disclosed constitutes a preferred form, it is to be understood that other forms might be adopted.

What is claimed is as follows:

1. A device for retarding movement between two relatively movable members comprising, a cylinder attachable to one of said movable members, a piston within said cylinder and attachable to the other of said relatively movable members, opposed springs acting on the end surfaces of said piston for normally centering said piston within the bore of said cylinder, and means operatively connected with said piston and movable therewith for imposing frictional resistance to relative movement between the said cylinder and piston in proportion to the impact tending to cause relative movement between the said two members, said last recited means including friction elements and inertia weight members interposed between the end surfaces of said piston and said opposed springs.

2. The combination set forth in claim 1 wherein the friction elements include a deformable resilient member.

3. The combination set forth in claim 1 wherein the friction elements include a deformable resilient member having a metal ring secured to the peripheral edge surface thereof and a thin metal disc secured to an end surface thereof.

4. A device for retarding movement between two relatively movable members comprising, a cylinder attachable to one of said members, a piston disposed in said cylinder, said piston having a head portion and a rod portion integral therewith, said rod portion being attachable to the other of said members, opposed springs disposed in said cylinder and acting on opposite surfaces of said piston head portion for positioning said piston within said cylinder, and means operatively connected with said piston and movable therewith for imposing frictional resistance to relative movement between said cylinder and said piston in proportion to the impact tending to cause relative movement between said two members, said last recited means each including a deformable, resilient member having a metal ring secured to the peripheral edge surface thereof for engaging the inner wall of said cylinder, said resilient members being interposed between the opposite surfaces of said piston head portion and said springs and maintained in engagement with the opposite surfaces of said piston head portion by said springs.

References Cited in the file of this patent

UNITED STATES PATENTS

| | | |
|---|---|---|
| 2,010,623 | Bugatti | Aug. 6, 1935 |
| 2,055,242 | Smith | Sept. 22, 1936 |
| 2,088,450 | Tea et al. | July 27, 1937 |
| 2,497,829 | Baselt | Feb. 14, 1950 |
| 2,570,371 | O'Connor | Oct. 9, 1951 |

FOREIGN PATENTS

| | | |
|---|---|---|
| 869,774 | France | Nov. 17, 1941 |